United States Patent [19]

Waldron et al.

[11] Patent Number: 5,077,656
[45] Date of Patent: Dec. 31, 1991

[54] CPU CHANNEL TO CONTROL UNIT EXTENDER

[75] Inventors: Billy B. Waldron, Norwalk, Conn.; James B. Klingensmith; Ernest H. Wilson, Jr., both of San Jose, Calif.; Matthew Harris, Danbury; Paul Yursis, Fairfield, both of Conn.

[73] Assignee: ChannelNet Corporation, Shelton, Conn.

[21] Appl. No.: 559,516

[22] Filed: Jul. 23, 1990

Related U.S. Application Data

[63] Continuation of Ser. No. 279,250, Dec. 1, 1988, abandoned, which is a continuation of Ser. No. 841,809, Mar. 20, 1986, abandoned.

[51] Int. Cl.⁵ .............. G06F 13/00; G06F 13/10; G06F 13/12; G06F 13/38
[52] U.S. Cl. .................... 395/325; 364/238.3; 364/238.6; 364/239; 364/239.2; 364/239.7; 364/241.9; 364/265; 364/265.1; 364/265.5; 364/266.5; 364/DIG. 1
[58] Field of Search ... 364/200 MS File, 900 MS File

[56] References Cited

U.S. PATENT DOCUMENTS

| | | | |
|---|---|---|---|
| 3,336,582 | 8/1967 | Beausoleil | 364/200 |
| 3,400,372 | 9/1968 | Beausoleil | 364/200 |
| 3,411,143 | 11/1968 | Beausoleil | 364/200 |
| 3,582,880 | 6/1971 | Beausoleil | 371/13 |
| 3,582,906 | 7/1971 | Beausoleil | 364/200 |
| 3,732,374 | 5/1973 | Rocher | 370/85 |
| 3,818,199 | 6/1974 | Eibach | 371/11 |
| 3,919,483 | 11/1975 | Gimdi | 370/85 |
| 4,007,449 | 2/1977 | Vercesi | 364/200 |
| 4,067,059 | 1/1978 | Derchak | 364/200 |
| 4,155,117 | 5/1979 | Mitchell, Jr. et al. | 364/200 |
| 4,170,038 | 10/1979 | Bouvier et al. | 364/200 |
| 4,195,351 | 3/1980 | Barner et al. | 364/900 |
| 4,218,740 | 8/1980 | Bennett | 364/200 |
| 4,227,178 | 10/1980 | Gergaud | 340/825.52 |
| 4,241,398 | 12/1980 | Carll | 364/200 |

(List continued on next page.)

FOREIGN PATENT DOCUMENTS

87104576.1 3/1987 European Pat. Off.
0242634 10/1987 European Pat. Off. ............ 364/200

OTHER PUBLICATIONS

Lynch et al., "Serial Channel to I/O Interface", IBM Technical Disclosure Bulletin, vol. 19, No. 8 (Jan. 1977), pp. 3139–3143.
IBM 3044 Riber-Optic Channel Extruder Link Product Description.
Suminet-9710 Fiber Optic Interface Extender.
Pixnet Proposal Prepared for The Hartford.
IBM 3088 MultiSystem Channel Comm. Unit.
IBM 3088 Installation Consideration.

*Primary Examiner*—Thomas C. Lee
*Assistant Examiner*—Robert B. Harrell
*Attorney, Agent, or Firm*—St. Onge Steward Johnston & Reens

[57] ABSTRACT

A system is described with which data can be reliably transferred at high channel speeds between an IBM CPU channel and a remotely located control unit through a high speed full duplex data link that can be a T3 speed telephone line. A pair of similar coupler units are provided, one of which is connected by way of conventional bus and tag cables to a channel and the other by such cables to the remotely located control unit. In one embodiment, the coupler units have extended buffers to enable retransmissions of entire data blocks in case of error. A special counter technique is described whereby the transfer of fixed length data blocks for I/O devices such as printers can be accommodated without creating incorrect length problems with the channel. A high speed microprocessor is used to regulate the initialization and end sequences needed to establish communication between the channel and a control unit while a data transfer assist logic controls the transfer of data which is transmitted over the serial data link without interlock signals normally used between a channel and a control unit. A data streaming mode is accommodated.

31 Claims, 13 Drawing Sheets

FOREIGN PATENT DOCUMENTS

| | | | |
|---|---|---|---|
| 4,249,239 | 12/1980 | Mescam | 364/200 |
| 4,292,623 | 9/1981 | Eswaran | 340/825.5 |
| 4,293,924 | 10/1981 | Struger et al. | 364/900 |
| 4,314,334 | 2/1982 | Daughton et al. | 364/200 |
| 4,320,515 | 3/1982 | Burton, Jr. | 375/4 |
| 4,363,093 | 12/1982 | Davis et al. | 364/200 |
| 4,365,296 | 12/1987 | Ulmer | 364/200 |
| 4,373,183 | 2/1983 | Means | 364/200 |
| 4,413,319 | 11/1983 | Schultz et al. | 364/200 |
| 4,466,063 | 8/1984 | Segarra et al. | 364/200 |
| 4,495,564 | 1/1985 | Draper | 364/200 |
| 4,514,823 | 4/1985 | Mendelson et al. | 364/900 |
| 4,597,073 | 6/1986 | Staples | 370/24 |
| 4,642,629 | 2/1987 | Milligan | 340/825 |
| 4,712,176 | 12/1987 | Fredericks | 364/200 |

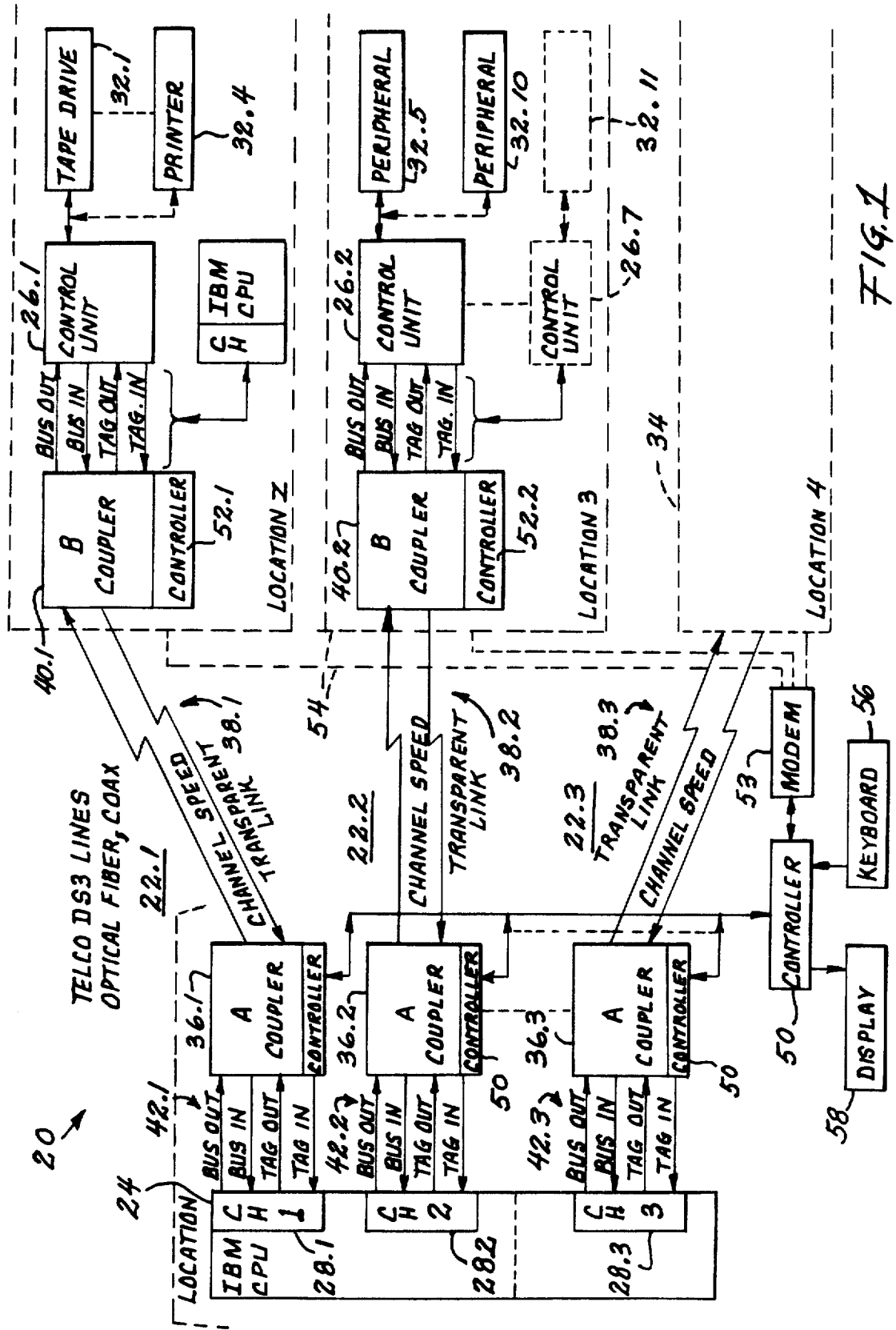

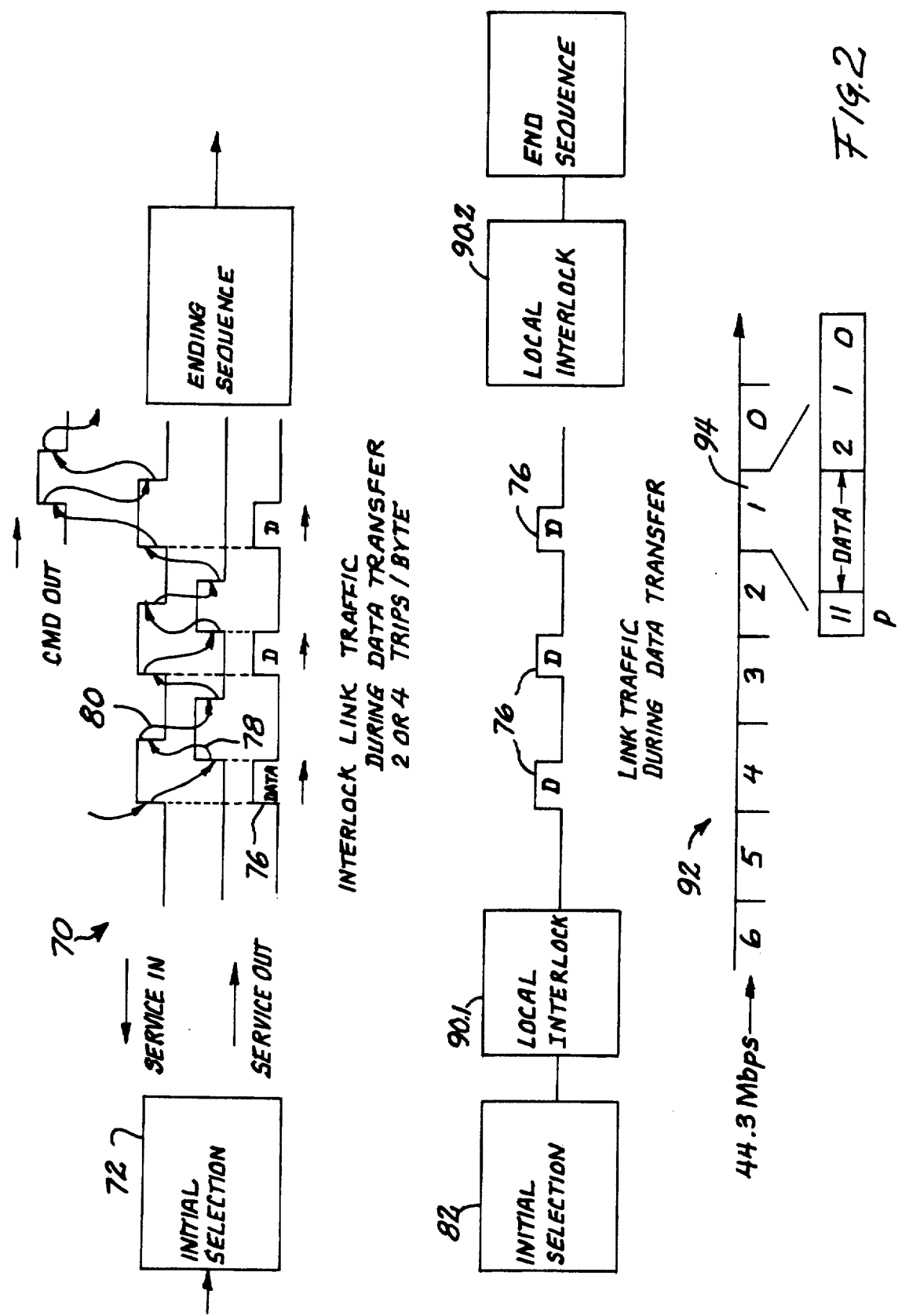

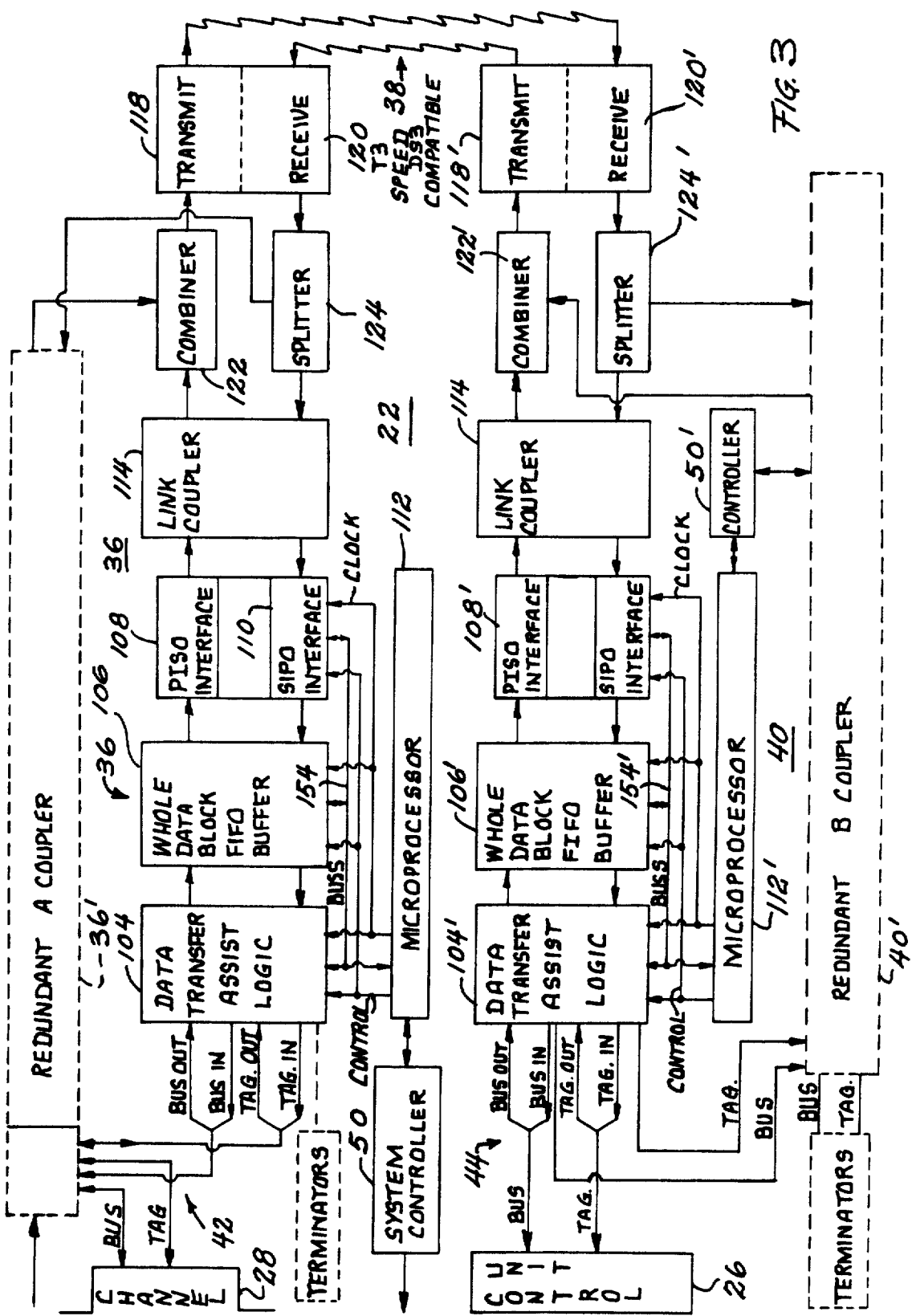

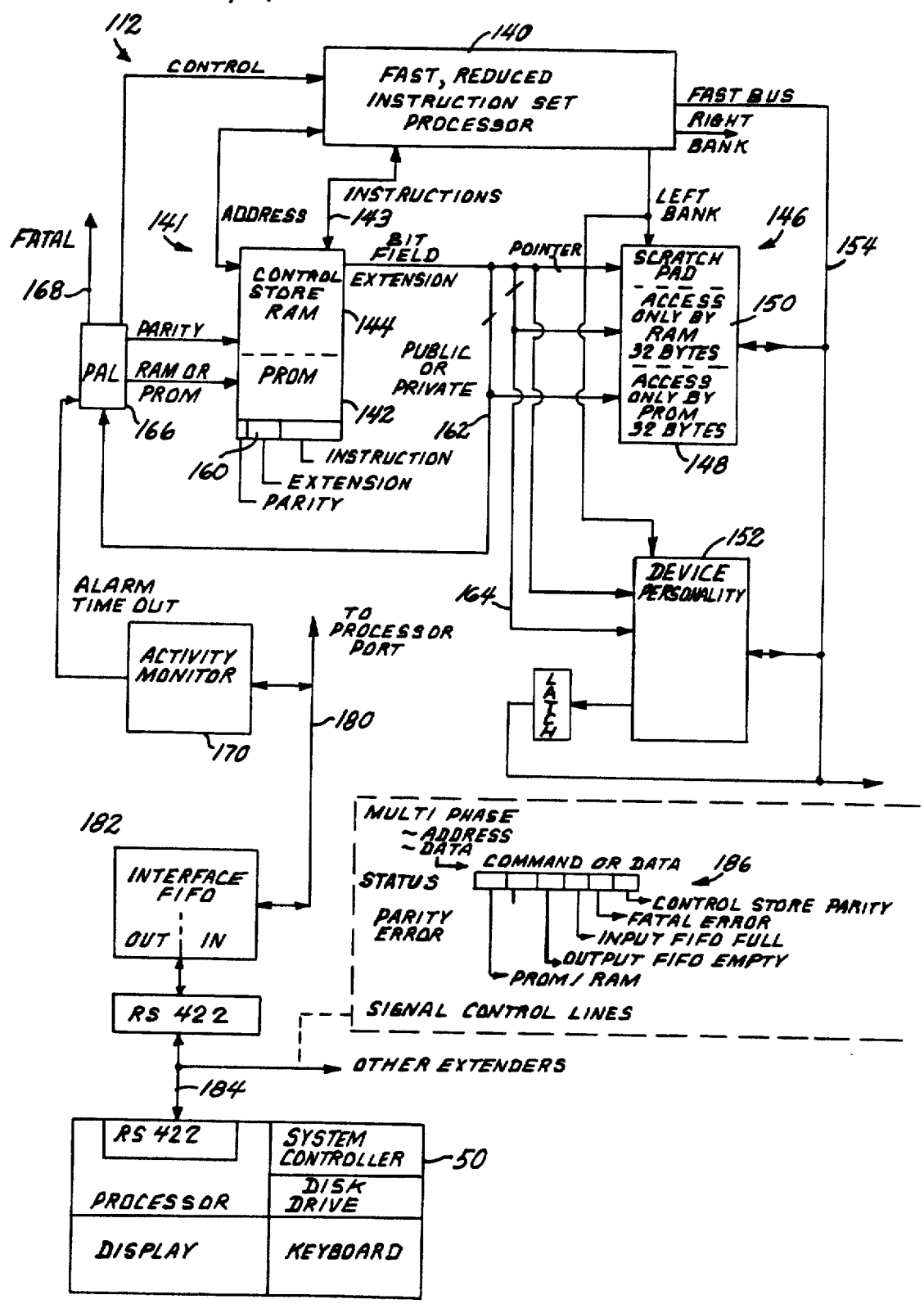

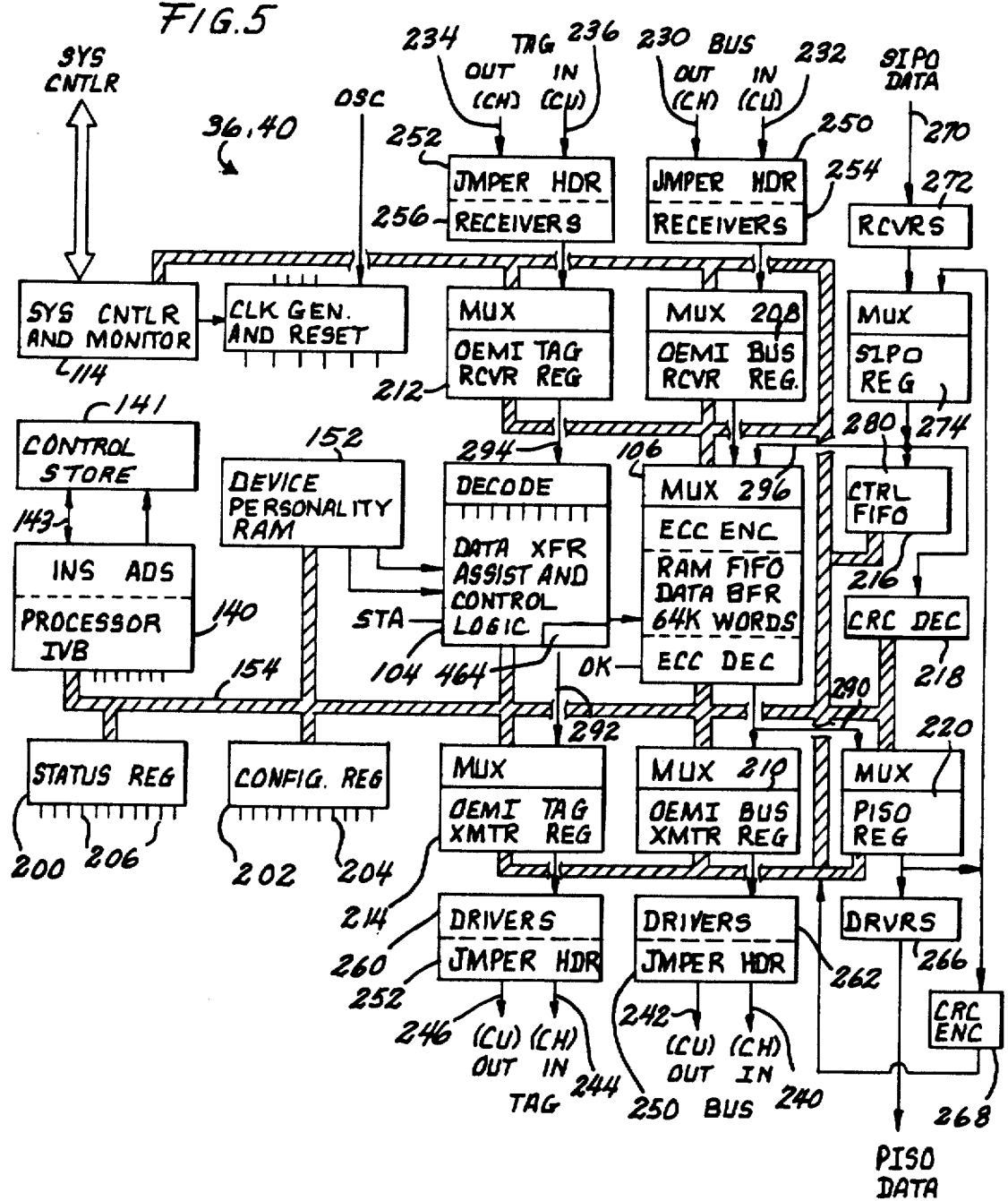

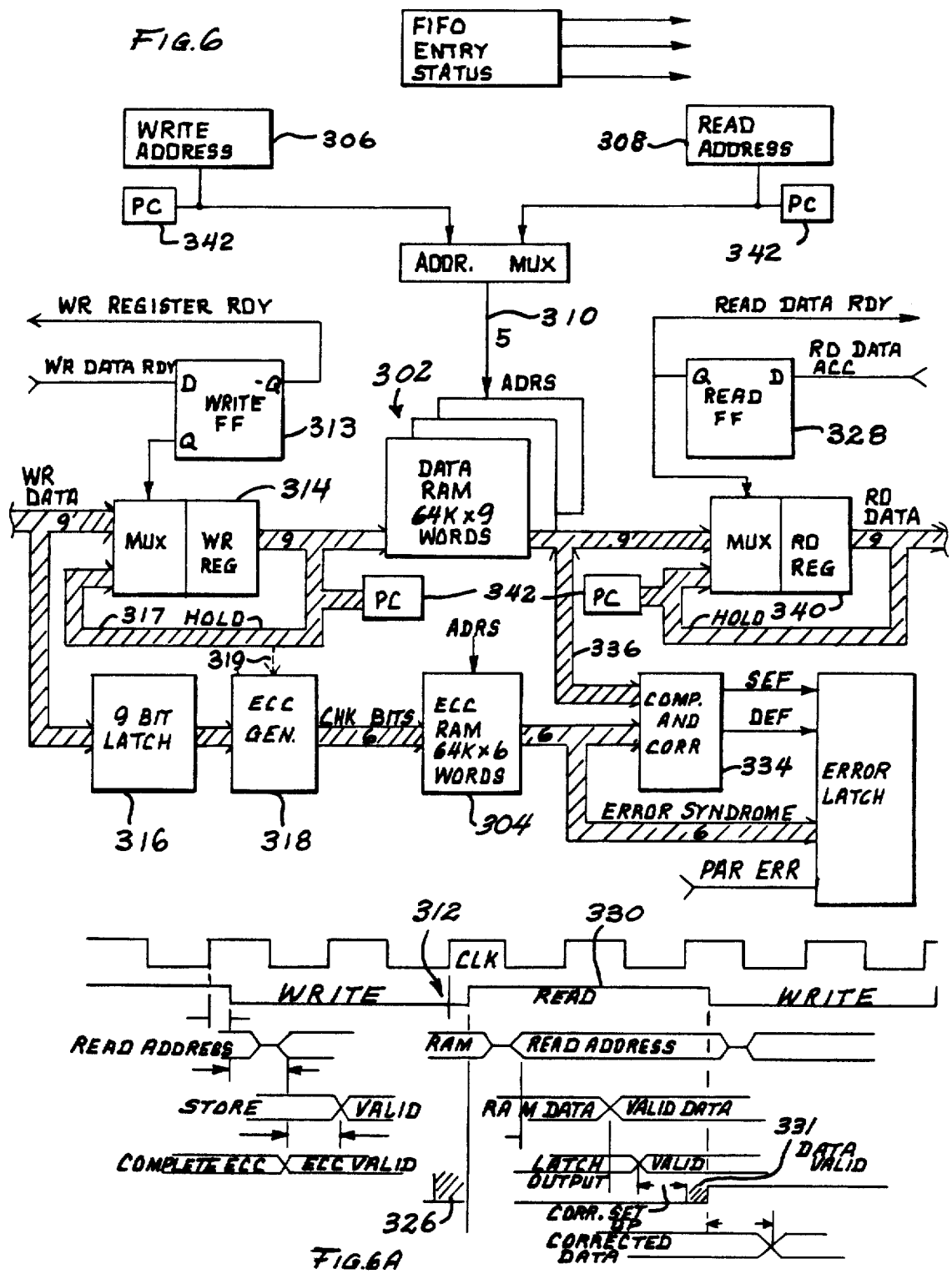

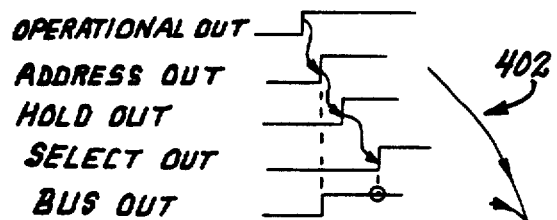
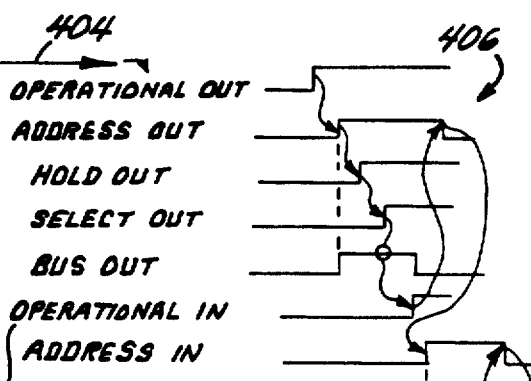
FIG.8A  A SIDE, CHANNEL   B SIDE, CONTROL UNIT
400

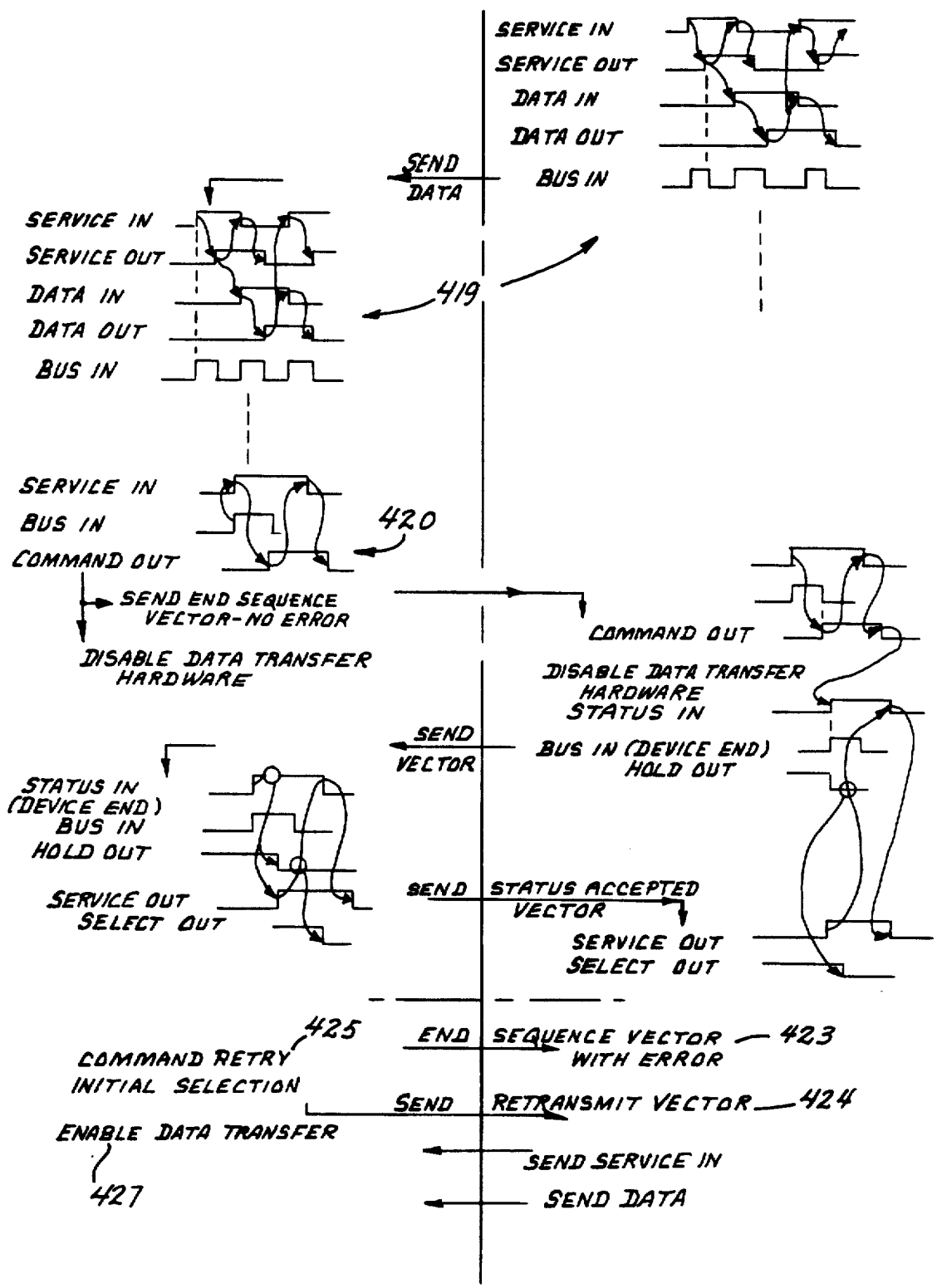

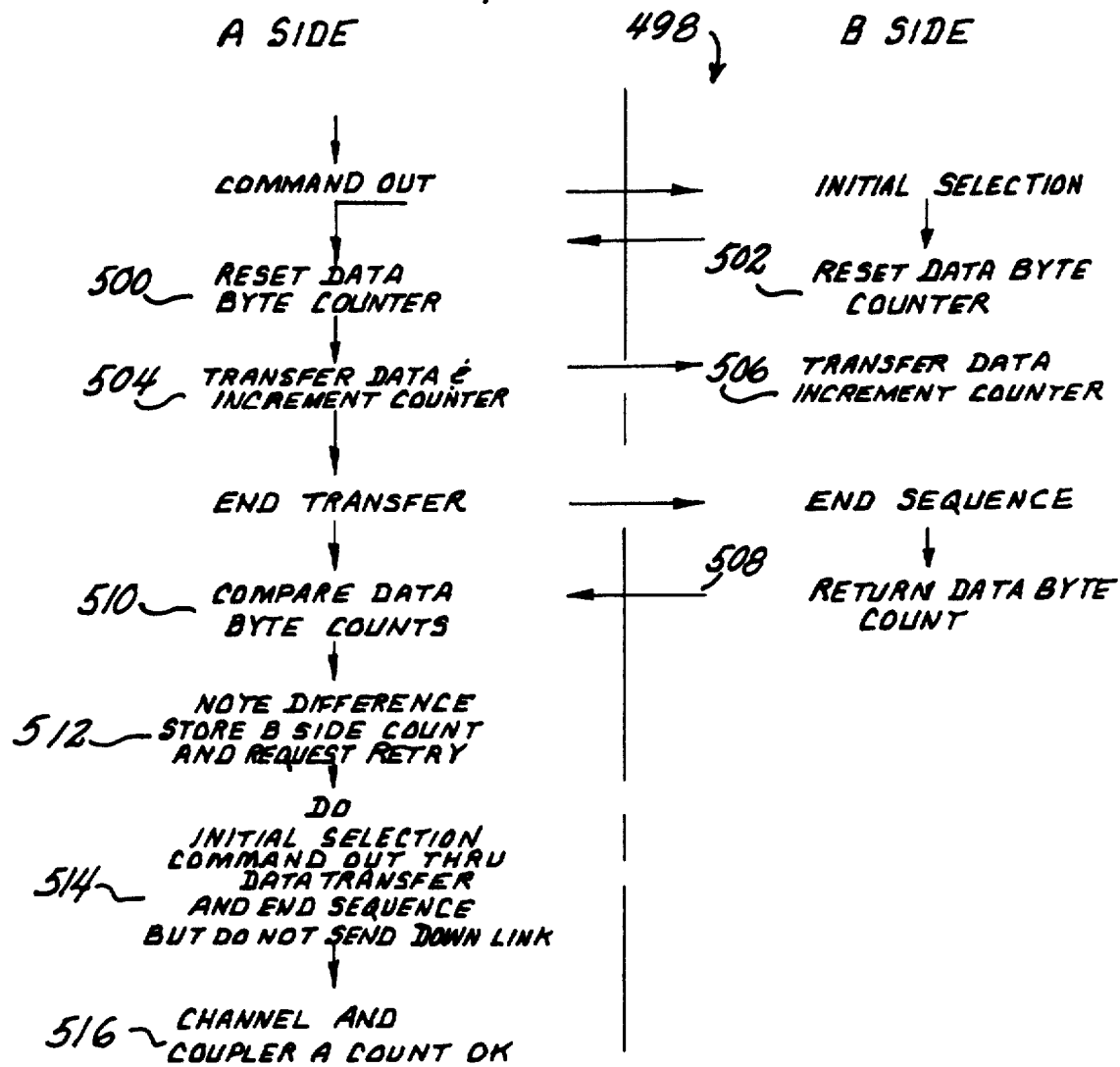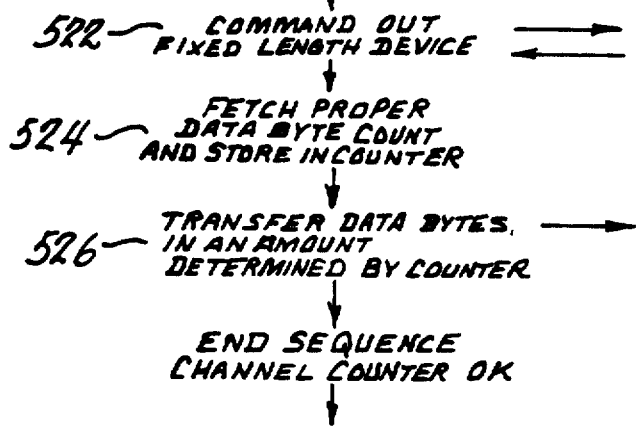

CPU CHANNEL TO CONTROL UNIT EXTENDER

This is a continuation of copending application(s) Ser. No. 07/279,250 filed on Dec. 1, 1988 now abandoned. which is a continuation of co-pending application Ser. No. 06/841,809 filed on Mar. 20, 1986 now abandoned.

FIELD OF THE INVENTION

This invention relates to computers generally and more specifically to a method and apparatus for extending the distance over which an IBM computer channel can communicate through a serial data link with an IBM control unit at channel speeds.

BACKGROUND OF THE INVENTION

In a conventional IBM mainframe environment a central processor unit (CPU) has typically a plurality of input/output channels which are connected by cables to communicate in an interlocked manner with peripheral devices through devices known as control units. In a typical connection an IBM channel will have input and output bus and tag lines, special interlock and control lines, each of which is a coaxial cable that is carefully shielded and terminated to maintain the integrity of the signal lines. These lines are required by IBM to be limited in length in order to preserve certain timing constraints in an interlocked communication operation between a CPU channel and a control unit. Hence, even if the initial expense of larger coaxial cables is warranted to, for example, place peripheral devices in another building than where the CPU is located, the timing constraints tend to limit the separation distance.

The communication protocol between an IBM mainframe CPU channel and external devices through a so-called I/O interface has been publicly described. One such publication is by IBM itself and is entitled, IBM System/360 and 370 I/O Interface Channel to Control Unit OEMI, published originally in 1971 under GA22-6974. Patents on the I/O interface have issued, such as U.S. Pat. Nos. 3,336,582, 3,400,372 and 3,582,906 to Beausoleil et al and many others. A key feature of the channel I/O interface is that the rise and fall of all signals transmitted over the interface are generally controlled by interlocked responses.

Techniques have been proposed to extend the IBM channel so that it can communicate at high speeds with a remotely located control unit. One such technique proposed by IBM itself is known as the 3044 system and enables a channel to communicate with a remotely located control unit through a fiber optic data communication link. The product, as described in IBM's Publication Number GA22-7097, extends the channel-to-control-unit distance to a maximum of 2000 meters (6,600 ft). The effect of the extender as a practical matter reduces the effective data rate, thus undesirably increasing the channel busy time. This speed reduction is believed to arise by virtue of the interlocked operation, by which for each data byte that is transmitted at least two or four additional link trips are needed to complete a transfer of the data byte.

When CPU's at remotely located sites are desired to be connected, a well known technique involves a teleprocessing link and a pair of so-called front-end-processors (FEP). Such FEP to FEP link, however, downgrades the speed at which the CPU can communicate with a control unit and thus limits the information flow.

Another system proposes a remote communication between an IBM CPU and a control unit. This system has a remote control unit that interfaces with remotely located peripheral devices and has a local control unit that interfaces with a CPU channel. Data from a channel is formatted into standard frames suitable for transmission through a network. The operating speed between the CPU and a remote control unit is limited in a full duplex mode to about 56 kilobits per second which is far below channel speeds that may be as high as 3 megabytes per second.

SUMMARY OF THE INVENTION

In a system and method in accordance with the invention, an IBM CPU channel can communicate with a remotely located control unit to transfer data to or from a peripheral device at channel speeds in a software and/or hardware transparent manner. Such communication may be done over full duplex high speed links that can be optical fibers, coaxial cables, microwave and the high speed telephone company link known as DS3, with these links having sufficient bandwidth to enable to support channel speed communication. The communication is done through a channel-attached coupler unit and a remotely located control unit-attached coupler unit with local attachments being made through conventional bus and tag cables.

With a system and method in accordance with the invention, a highly reliable data communication is achieved between a channel and a control unit even when long public links are used to transfer data, yet data can be transferred at channel speeds in a software and/or hardware transparent manner. Both burst mode and data streaming modes are accommodated over distances that far exceed the distance limitations of conventional bus and tag cables.

When a communication link between a channel and a remote control unit is established, it is important to assure that the channel busy time is not increased. With a channel to remote control unit system as proposed by the IBM 3044, link lengths affect the available data rate and as a result, increase channel busy time. With a method and system in accordance with the invention, channel busy time is essentially independent of link length so that the data rate for devices such as printers remains high and channel busy time remains low.

When an IBM CPU channel needs to transfer data at channel speeds to remotely located devices, (typically printers) which require fixed length data blocks, it is possible that such transfers result in a conclusion by the channel that an incorrect data block was sent and thus, cause the generation of an error. With a system and method in accordance with the invention such incorrect-data-length problem is advantageously avoided. One approach involves the use of a counter mechanism in both the coupler unit that is attached to the channel and the coupler unit attached to the control unit.

Another technique for preventing incorrect length problems involves the storage in the coupler units of key characteristics of the devices attached to the remote control unit. In such case a device that requires fixed length data blocks can be recognized and the correct length placed in the counter of the channel-attached coupler unit.

With a channel-to-control unit extender in accordance with the invention, significant error recovery procedures are made available. For example, when data is to be sent to a remote tape unit by a channel the detection of a parity error at the control-unit side, and attributable to the serial data link transmission, can be recovered from without reporting an error to the channel. This involves the use of a buffer in the coupler unit at the channel end and the remote end with sufficient capacity to store the entire block of data being sent in response to any one command to the tape-end before recording on to a tape. In case of the detection of an error at the tape side, a request is sent to the buffer on the channel side to retransmit the data. The data is preserved in the sending buffer until the coupler unit at the tape side has reported an error free receipt of the data. This is particularly advantageous since it avoids having to back-up a tape if the data were allowed to be immediately recorded as it is received.

The data transfer may be done in a block to block manner from buffer to buffer before entering the channel or device as the case may be. Another technique involves the transmittal of a block of data on a continuous basis directly into a channel from an I/O device until an error, such as may be attributable to the data link, is detected. After such error, the system can automatically revert to a block by block transfer operation until confidence in the transmission link is restored, for example, after a predetermined number of transmissions without error.

In a channel-to-control unit extender system of this invention, the coupler units at the ends of the data link can be made of identical hardware, yet made to function as a control unit at the channel end and a channel at the control unit end by the down loading of appropriate software from a central controller that is a part of the system. A cross-over device can be used between the bus and tag cables and a coupler unit to convert it from one that acts as a channel to one that acts as a control unit or vice versa. The cross-over device can be in the form of a jumper plug or cross-over switch placed between the coupler unit and the bus and tag cables.

It is, therefore, an object of the invention to provide a channel-to-control unit extender system with which an IBM CPU channel can communicate with a remotely located control unit and I/O devices attached thereto through a serial data link at channel speeds in a manner that is transparent to the software in the CPU. It is a further object of the invention to provide such extender system with error recovery techniques that enable reliable use of private serial data links and even public wide bandwidth communication lines capable of handling high channel speeds including data streaming.

These and other advantages and objects of the invention can be understood from the following description, made with reference to the drawings, of several embodiments in accordance with the invention.

BRIEF DESCRIPTION OF DRAWINGS

FIG. 1 is a schematic representation of a plurality of channel to control unit extender systems in accordance with the invention;

FIG. 2, is a schematic timing representation of a comparison of a system of this invention with a fully interlocked prior art extender system;

FIG. 3 is a block diagram view of a channel to control unit extender system in accordance with the invention;

FIG. 4 is a block diagram of the microprocessor and controller used in the system of FIG. 3;

FIG. 5 is a block diagram of data paths in coupler units used, in the system of FIG. 3;

FIG. 6 is a block diagram of a buffer system employed in the system of FIG. 3;

FIG. 6A is a timing diagram of an operating cycle of the buffer used in the system of FIG. 3;

FIGS. 8A and 8B are respectively successive vertically arranged timing diagrams of an initial selection and data transfer by the system of FIG. 3;

FIGS. 11 and 12 are respectively alternate vertically arranged timing diagrams for preventing incorrect length problems with write sequences.

DETAILED DESCRIPTION OF DRAWINGS

Figure 6B:
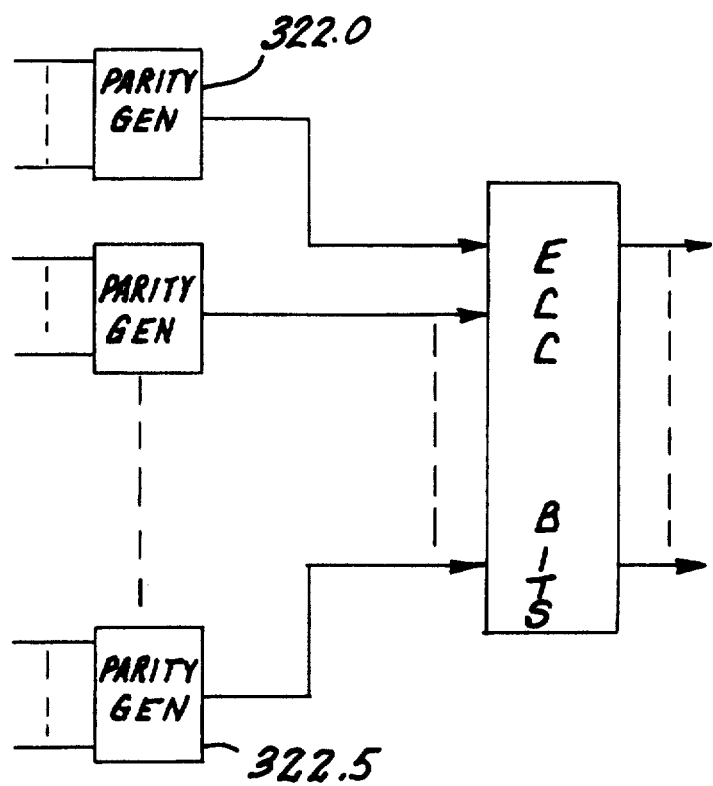
FIG. 6B is a block diagram of a network used to generate an error correction code for use with the buffer systems shown in FIG. 6.

With reference to FIG. 1 an illustrative system configuration 20 is shown in which channel to control unit extender systems 22 in accordance with the invention enable an IBM CPU 24 at one location to be connected to remotely located control units 26. The configuration 20 is exemplary and many variations can be implemented. A first system 22.1 enables a channel 28.1 of CPU 24 to communicate with a control unit 26.1 that in turn is connected to I/O devices 32 such as a tape drive 32.1 and printer 32.4.

Similarly extender system 22.2 couples a channel 28.2 of CPU 24 to a plurality of control units 26.2–26.7 at still another location. A third extender system 22.3 connects a third channel 28.3 to control units at a third location 34.

Each extender system 22 is formed of a channel coupler 36 on the A side, a serial full duplex high speed data link 38 and a control unit coupler 40 on the B side. The channel coupler 36.1 is connected by way of bus and tag cables 42.1 to channel 28.1 and the other couplers 36 are connected in a similar manner to respective channels as shown. Similarly, the control unit couplers 40 are connected by way of bus and tag cables 44 to control units 26.

The serial bidirectional data links 38 may be formed of various wide bandwidth media such as coaxial cable, microwave or fiber optic cables. Data link 38 may be a wide bandwidth DS3 telecommunication link. The links 38 are indicated as "transparent", in reference to the fact that, to the channels 28, it appears that the I/O devices 32 are nearby and to the control units 26 it appears as if the channel is nearby, even though links 38 may be as long as five kilometers. The channel coupler 36 on the A side thus functions as if it were a control unit and the control unit coupler 40 on the B side functions like a channel.

Control over each individual extender system 22 is obtained with a controller 50 at each link end and in the case of the coupler units on the A side may be concentrated at one controller 50. Each B side coupler unit 40 has a controller 52. Communication destined for and between controllers 50 and 52 can be through data links 38 or through separate modems 53 and low frequency communication lines as indicated by dashed lines 54. The controller 50 has a keyboard 56 and display 58.

One advantage of the extender system 22 can be appreciated with reference to FIG. 2. Here at 70 a typical operational sequence for an IBM 3044 channel to control unit extender is shown. An initial selection is made at 72 which involves the generation of signals as are well known and publicly described to achieve communication between a channel and a control unit. Once initial selection is achieved data transfer occurs in an interlocked multiple link trip manner as shown at 74 whereby one side sends a data byte such as 76 followed by a return link signal 78 and acknowledgement 80, all in opposite directions and needed to transfer one byte of data. This increases the number of link trips per byte, reduces the operating speed of the extender and increases busy time of the connected channel.

In the extender system 20 an initial selection sequence 82 is followed by a data transfer as done at 84 by only transmitting the bytes 76. The interlock signals are generated locally at each link end from the respective A and B coupler units 36, 40 with local interlock circuits 90.1 and 90.2. These interlock circuits 90 are enabled whenever a byte of data has arrived and produce appropriate signals to the channel 28 or control unit 26 as the case may be. Circuits 90 are known in the art, see for example the aforementioned U.S. Pat. No. 3,336,582.

Hence, extender system 20 can transfer data at full channel speed of 3 megabytes per second through the data link 38. For such speed the bit rate through data link 38 is set sufficiently high for overhead purposes, 44.3 Mbps, which is a speed that is compatible with the T3 speed through a DS3 telephone company communication link. Data transmission through a data link 38 may thus be formatted in accordance with DS3 standards such as a subframe 92 formed of 7 twelve-bit data words 94. The data words 94 are organized into eight bits of data plus parity, two control bits and one global parity bit. The eight bits plus parity are compatible with the CPU and control unit data format.

FIG. 3 illustrates components of a channel to control unit extender system 22 which, to a limited extent, are similar to the components used in a system as described in a copending patent application entitled, CPU Channel To CPU Channel Extender, and filed on 3/20/86 Ser. No. 841,808 and which is assigned to the same assignee as of this patent application. Thus extender system 22 as shown in FIG. 3 includes a data transfer assist logic network 104 connected to the bus and tag lines 42 and formed of circuits used to handle the transfer of data at channel speeds along its interface with the channel 28 and to a buffer 106.

A data-block sized FIFO (first in first out) buffer 106 receives the data and stores the entire block of data that needs to be transmitted to or received from a control unit 26 in response to a single command or service request. A parallel to serial (PISO) converter 108 transforms the parallel bytes from the channel 28 to serial format and a serial to parallel (SIPO) converter 110 transforms data received through link 38 to parallel format for storage in buffer 106 or for transfer to a microprocessor 112. The microprocessor 112 controls initial selection sequences, directs the direction of data flow, enables the transfer of data to start to or from the OEMI interface and serial link interface, controls whether data streaming or interlocked transfers should occur, establishes counters, retry states, fixed length transfer modes, checks counter values, performs cyclic redundancy (error) comparisons, samples parity detection logic to ascertain data integrity. A system controller 50 is coupled to microprocessor 112 and may be a small computer with a display and keyboard In the event data link 38 as shown is a T3 speed telephone company link, special link couplers 114, 114' are used to encode and decode data in the DS3 format that is acceptable and required for a T3 speed link. The encoding and decoding requirements are well known and practiced. Since link 38 may be formed of private lines, such as fiber optics, suitable optical modulators and demodulators may be used in transmitters 118 and receivers 120 in place of those needed for T3 link communication.

Extender system 22 is made more reliable with a redundancy capability by which a spare A and/or B side couplers 36', 40' can be switched in at combiner circuits 122 and splitter circuits 124. Controllers 50, 50' are connected to the spare couplers 36', 40' to establish and maintain operational control.

With reference to FIG. 4 the microprocessor 112 is shown in greater detail. It is primarily made with a capability of supporting an instruction cycle time of 200 nanoseconds, and has a reduced instruction set such as the 8×305 processor 140 made by the Signetics Corporation. Additional memory and controls are provided as illustrated. Signetics publishes an extensive manual for the use and implementation of this processor 140. In the microprocessor 112 a control storage 141 formed of a PROM (Programmable Read Only Memory) 142 is provided to store instructions for a start-up procedure (applied along bus lines 143) used to activate the A coupler 36. In addition a more extensive RAM memory 144 is provided to store full operational instructions as may be down loaded from controller 50. A scratch pad memory 146 is provided, part 148 of which is only available to the program in PROM and the other part 150 is only available to the program in RAM.

A device personality memory 152 stores key characteristic data of I/O devices connected at the control unit side so that fixed length data can be handled for devices such as printers. Initially stored characteristics are data capability of the devices, fixed length transfer commands and their respective byte counts. Dynamic personality data that are stored include conditions such as, the on-line/off-line state of a remote link coupled device, control unit busy condition (to which a control unit end status interrupt is owed), and a pending command retry at the channel. A bidirectional bus 154 is connected to the scratch pad 146, the device personality memory 152 and external devices as will be explained with reference to FIG. 5.

The memories 142, 144 store instructions for processor 140 and each stored instruction word includes an extension field, such as 160, that is used to activate certain events and/or memories. For example, one bit in the extension field on line 162 is used to determine which memory, PROM or RAM is to exercise control. Other bits identify the scratch pad address and still another bit on line 164 enables or disables access to the personality memory 152. A programmable array logic circuit (PAL) 166 is used to monitor parity conditions of memories 142, 144 and activate alarm conditions in case of a parity error, or other failure condition. For example, a parity error in RAM 144 may cause a correctable response such as an automatic switch over to the PROM memory 142, whereas a parity error in PROM or a failure of any activity in the link between the microprocessor 112 and controller 114 as sensed by monitor 170 create a fatal error response on line 168 with a shutdown of extender system 22.

Communication with controller 50 occurs along a bidirectional bus 180 through a buffer interface 182 and a noise secure communication link 184 known as RS422. Controller 50 makes regular status inquiries of processor 140 along the control lines 184 as illustrated at 186.

FIG. 5 provides a more detailed view of the data paths in a coupler 36 or 40 and shows the connection of the microprocessor 112 with the various ports of the coupler unit. The bidirectional bus 154 from processor 140 is shown connected to various devices by bus 154 such as, a status register 200, and a configuration register 202. The configuration register 202 is used to initialize the state of the coupler unit at power on or during the time of a down load of microcode from controller 50 or 52 into the memory 141 (see FIG. 4). The register 202 also includes information as to whether the coupler unit is to function as a channel connected A side coupler or a control unit connected B side coupler. The register 202 enables independent diagnostic control of the various interfaces, parity polarity control for diagnosing parity check logic, on-line/off-line state control and establishes redundancy switching control in case of certain errors. Information is stored in register 202 by other circuits in coupler 36 or 40 as suggested by lines 204.

The status register 200 is tested by processor 140 for conditions that signal the beginning or end of an operation with a channel or control unit as the case may be, and includes data integrity check conditions, system controller 50 requests and acknowledgements and the fill level of the data FIFO buffer 106 (such as FIFO not empty). This register serves primarily as a read only source for events in other ports of the coupler and which are directly stored in the register as suggested by input lines 206.

Bus 154 further is coupled to, the data transfer logic network 104, data FIFO buffer 106, bus registers 208, 210 and tag registers 212, 214 through multiplexers 216 as shown, and to outputs of these registers. Bus 154 is further shown connected to, a control FIFO buffer 216, a cyclic redundancy code decode logic network 218 and a PISO (Parallel In to Serial Out) register 220.

The OEMI (Original Equipment Manufacturer Interface) bus receiver register 208 captures the channel Bus-Out lines 230 (A side configuration) or in case of a control unit connection, or a B side configuration, the Bus-In lines 232. Under various handshaking routines this register holds the device address, device command, device status or data.

The OEMI tag receiver register 212 captures the Tag-Out line 234 from a channel (A side configuration) or Tag-In lines 236 from a control unit (B side configuration). These lines are sampled by the microprocessor 140 and data transfer logic depending upon the established protocol. The various tag state decodes, whether done in the data transfer logic 104 or by processor 140, provide the necessary input for generating appropriate tag responses that are placed in the output or transmitter tag register 214.

The OEMI bus transmitter register 210 is used to place information on bus-in lines 240 for a channel connection (A side configuration) or on bus-out lines 242 for a control unit configuration. Under various handshaking protocols of the OEMI this register 210 holds the device address, device command, device status or data.

The OEMI tag transmitter register 214 is used to send the signals onto tag-in lines 244 for a channel connection or A side configuration or onto tag-out lines 246 in a control unit or B side configuration. These lines are activated by the microprocessor 140 and data transfer logic 104 depending upon the required protocol.

The flow of data through coupler 36 or 40 is shown in FIG. 5 and commences for example with an initial selection sequence that is initiated by activating appropriate tag-out and bus lines 230, 234 from a channel for an A side coupler. The signals on these lines pass through jumper header connectors 250, 252 receivers 254, 256 into register 212 and then through the bus 154 into the processor 140. This in turn responds with certain well known protocol levels applied through, bus 154, registers 210 or 214 or both through drivers 260, 262 and connectors 250, 252, to bus-in and tag-in lines 240, 244 back to the channel.

When signals during initial selection need to be sent through the data link 38, bus 154 delivers the parallel bytes to the PISO register 220. This transmits twelve bit encoded words 94 (see FIG. 2) through drivers 266 to the PISO circuit 108 (see FIG. 3) at a maximum rate of 3.68 megawords per second. At the appropriate time a standard CRC (cyclic redundancy code) code is formed in encoder 268 (see FIG. 5) and appended to the word packet that is being sent over the data link.

When a return word is being received the SIPO circuit 110 (see FIG. 3) presents a parallel word 94 (see FIG. 5) on lines 270 and is passed through receivers 272 into a SIPO register 274. Data is received at the rate of 3.68 megawords per second. If the received word is a control for processor 140 it is passed into a control FIFO buffer 280 and from there along bus 154 into the processor 140 for a response that may be, back along the link 38, or to the channel, or enablement of the data transfer logic 104 or reporting of an error to the controller 50.

When data needs to be transferred from the channel to the remote control unit, data transfer logic 104 is enabled by processor 140 and then controls the data path through the coupler. Data is received through bus-out lines 230 and passed through register 208 into the FIFO buffer 106. Data is directly passed on, though retaining all of it in buffer 106, at channel speed of 3 megabytes per second, along path 290 into the PISO register 220 for transmittal along the data link 38 to the control unit coupler 40. The protocol signals needed during data transfer are generated by data transfer logic 104 along path 292 to the tag-in lines 244 and responded to along the tag-out lines 234 passing along path 294.

When data is being received from the remote coupler unit, it is passed along path 296 into the FIFO buffer 106. As data is entered, a single error correction code is appended to each received data byte and the entire block of data with the correction code is stored in buffer 106. At the completion of the packet transmission, the CRC code that was appended by the remote coupler is compared in the processor 140 with the appended CRC code and, if equal, results in a successful link transmission.

In the event of an unequal comparison, a request is sent by the data transfer logic 104 via processor 140 for a retransmission from the buffer in the remote control unit, and the error is reported to the controller 50. Depending upon the nature or persistence of the error a spare coupler unit may be switched in.

The clock generation and reset logic network 300 in FIG. 5 provides the cycles for operation of the couplers 36, 40. A crystal oscillator, not shown, provides a stable source from which 25, 50, and 100 nanosecond cycle clocks are obtained for use by the microprocessor 112.

Reset logic is divided into different categories, for power-on, global and local reset. Power-on reset is applied to clear the hardware, inhibit all interface circuits and direct the microprocessor to its starting place in its PROM memory as described. A global reset can be invoked by the system controller, or the microprocessor and places the microprocessor at a particular starting point. A local reset is performed by the microprocessor in very specific situations such as in response to an error from which recovery is possible. The circuits affected by a local reset are defined by the microprocessor.

Note that a channel attached A side coupler can be changed to a control unit or B side coupler with a minimum of hardware change, namely, the jumper headers 250, 252 (see FIG. 5) and the use of a cross-over jumper plug. The other change involves a software alteration that is controlled by the appropriate downloading from the controller and alters the personality of the couplers. The drivers 260, 262 and receivers 254, 256 have enable/disable controls for isolation from the interface so that diagnostics can be executed to the extreme boundaries of a coupler unit.

The microprocessor 112 and the microprogram stored therein for control of the A and B side couplers 36, 40 are selected so that once an operation is initiated, all resources are dedicated to that until completion. An operation can be defined as a request for service from a control unit or an I/O initiation from a channel. The microprogram handles the non-time critical aspects of such operations. These include, responding to initial address selection, command selection, presentation of device status, command and status decoding and monitoring of abnormal conditions. These operations are well known and occur sequentially, thus requiring few subroutines.

The microprocessor as published by Signetics executes each operation in one instruction cycle (200 nanoseconds long) which is divided into four equal parts. During the first quarter cycle (50 nanoseconds) a new microinstruction is retrieved from control storage 141 (see FIG. 4) entered into processor 140 and decoded. If an I/O operation is indicated, new data is fetched from either an internal register or externally via bus 154. At the end of the first quarter cycle the new instruction is latched into the instruction register of the processor 140.

The input phase of instruction execution is completed during the second quarter cycle with preliminary processing and stabilization of I/O input data. At the end of the second quarter (100 nanoseconds) input data is latched and final processing can begin.

During the third quarter of the cycle the next microinstruction address is output, bus control signals are generated and data is set up for output.

The fourth and final quarter cycle produces a master clock signal (MCLK) that is used to latch either the I/O address or data into peripheral circuits (see FIG. 5) connected to bus 154. The master clock signal is also used to synchronize incoming data in the peripheral circuits to the microprocessor timing.

The microprocessor regularly polls for errors in coupler units 36, 40. The errors can be grouped into two classes, those that cause a hard stop and those the coupler unit can recover from. Hard stop errors are those indicating a failure of the integrity of the control hardware as usually determined with parity checking. The microcode would invoke a hard stop.

Recoverable errors can be handled under normal termination sequences and may involve error correction codes for use in the data buffer, or a retransmission from the remote data buffer. The control message packet sent along the data link is highly encoded to minimize the amount of communication over the link before and after the data transfer, thereby reducing the probability of encountering an error.

A particular advantage of the extender system 22 is its ability to recover from errors attributable to transmissions along the data link 38. This is obtained by storing, while sending, data at the sending end in FIFO data buffer 106 (see FIG. 3) and, when an error is detected at the receiving end a retransmission can be made. This is particularly desirable in case of a transmission from a tape drive that would have to be backed up to repeat a transmission.

FIGS. 6, 6A and 6B illustrate the FIFO buffer network 106 in greater detail. The buffer includes a RAM 302 of sufficient size to store the largest block of data normally transmitted between a channel and a control unit in a single uninterrupted data transfer. Such block length normally is limited by channel software even in a data streaming mode. The RAM 302, therefore, has a size of the order of sixty four kilobytes with each byte being nine bits wide, eight for data and one for parity.

In addition to the RAM 302 a RAM 304 is provided to store an error correction code (ECC) for each byte stored in RAM 302. The RAM 304 has the same storage size as RAM 302 but needs to be only as wide as the correction code has bits. The stored correction code enables corrections of a single bit error and detection of multiple bit error in each byte.

Access to the buffer RAMs 302, 304 is under control of write and read address memories, 306, 308, which provide pointers on line 310 where a data byte is to be written or read. The write and read cycles are complete in one cycle, as shown at 312 in FIG. 6A. Written data bytes are entered under control by the data transfer and assist logic 104 (see FIG. 5) through a write control 313. Data bytes are latched into a write register 314 and are applied to an error correction code generator 318, either through a latch 316, or directly from the write register 314 from a hold line 317, as suggested by dashed line 319. This produces as shown in FIG. 6B, through hamming code parity generators 320, an error correction code (ECC) plus a parity bit that is stored in a register. The ECC can be used to correct single bit errors and detect double bit errors in a data byte. At the end of a write cycle at 326, the data byte and its associated error correction code are stored.

Reading of data bytes is under control of the PISO register 220 (see FIG. 5) through a read control 328. The read part 330 of cycle 312 stores a data byte by the time indicated at 331 in a comparison and correction network 334 with the associated ECC for that byte. If a correctable single error is found, the data byte is corrected and sent back along the lines 336 into read register 340. Errors detected by network 334 and parity error from detectors 342, that are placed throughout buffer 106 are stored in latch 342 which is regularly monitored by the microprocessor 112.

With a buffer 106 a writing into and reading of data can be completed in 200 nanoseconds, thus preserving the high channel speeds throughout the coupler unit. Large data blocks are stored, yet data integrity is preserved and single bit errors are automatically recovered from.

Figure 7:
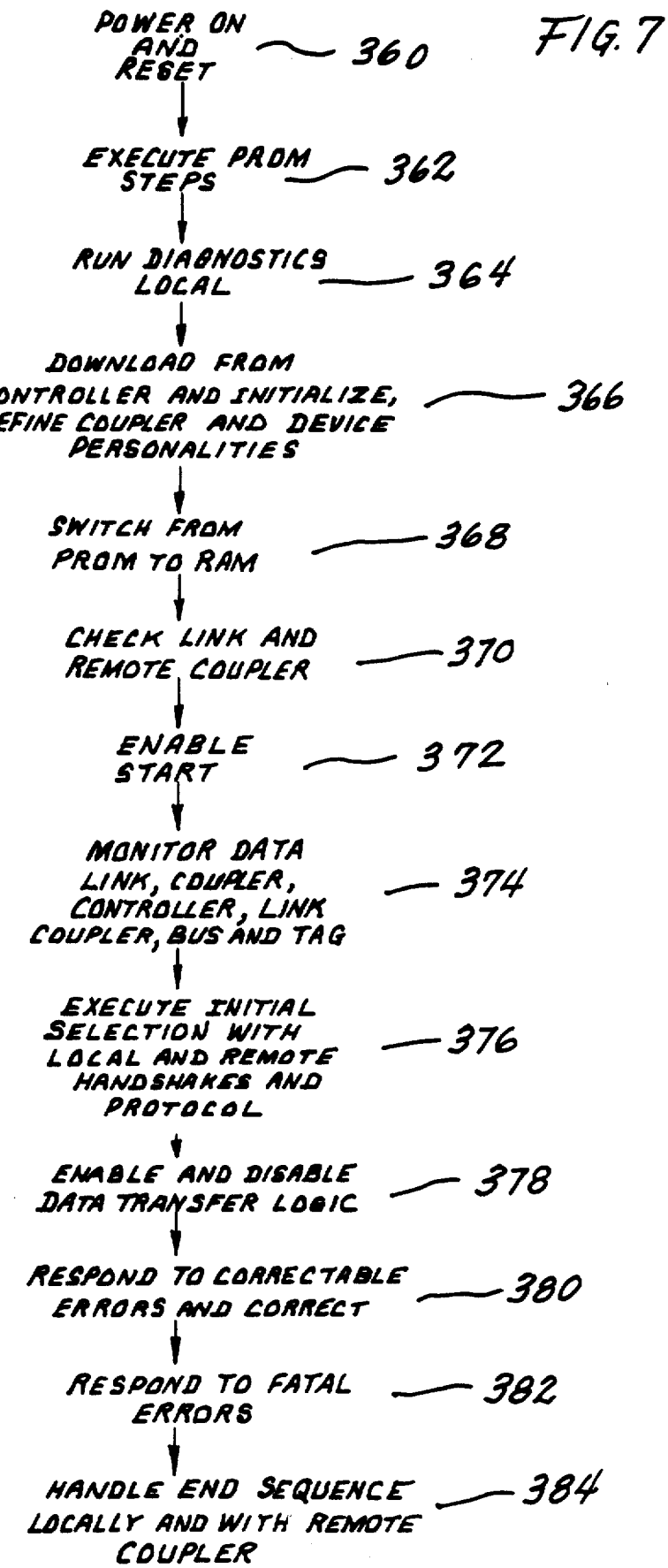
FIG. 7 is a flow chart of the operation of the system of FIG. 3.

Operation of extender system 22 commences as shown in FIG. 7 with a reset at 360 after power is applied. The microprocessor then executes at 362 those steps stored in PROM 142 (see FIG. 4). The steps set forth in FIG. 7 are shown sequentially but it should be understood that functions such as monitoring are carried out on a regular basis. A diagnostic is run at 364 on the local coupler.

The information needed to operate the coupler units 16, 20 is downloaded at 366 from respective system controllers 50 (see FIG. 3) and appropriate coupler definitions, whether it is to be operated as an A side channel connected device or a B side control unit connected unit are stored in the personality memory 152 (FIG. 4). If, available, key characteristics of connected I/O devices are stored.

When the downloading is complete, a switch is made at 368 from PROM memory control to RAM control and a diagnosis for the entire extender system 20 is done at 370 until at 372 operation can begin.

During operation each microprocessor monitors, as shown at 374, the coupler units 16, 20, the data link 38 and controller 50, for execution of normal operational functions as well as for errors.

At 376, for example, under microprocessor control, an initial selection sequence is carried out with associated communications between coupler units to observe required IBM channel-I/O protocols. Once a data path has been established the actual transfer of data bytes between a channel and a control unit is carried out at 378 under the control by the respective local data transfer assist logic networks 104, 104'. Data is transmitted at channel speeds.

If data byte errors are detected, such as at 380, recovery procedures may be implemented by automatic byte correction of a data byte in the FIFO buffer 106 or a retransmission of data from a buffer. Fatal errors are detected and responded to as these might occur at 382. End sequences are handled at 384 by each microprocessor in a coupler unit 16 and 20.

FIGS. 8A and 8B illustrate a typical example of a sequence 400 with data transfer in response to a channel request for a read of data from a remotely located I/O device. Local sequences follow IBM published protocols, signal sequences and the like while remote control is exercised through vectors sent at key instances when needed. This significantly reduces signal flow through the link with fewer errors. The sequences and protocols required to establish such communication must be complied with in accordance with IBM 360 and 370 published protocol. Hence, at 402 the channel commences with its initial selection signals that are locally recognized by the channel attached coupler. The latter's microprocessor promptly responds with an initial selection vector 404 that is sent to the remote coupler 20 on the B side together with the I/O address.

The B side coupler locally responds at 406 with an initial selection as if it were a channel and at some time the appropriate control unit responds, so that the B coupler can send a return vector at 408 to the A coupler to the effect that the I/O device is or is not available. If available, the effect of the latter vector is a response as at 410 on the A side, that a connection has been made on the B side, so that the sequence of address-in, bus-in with data that accompanied the vector 408 can be executed at 411.

Further, initial selection sequences arise such as command-out and bus-out at 412 on the A side, followed by the transmission of a vector 413 resulting in the same local sequence on the B side at 414 and followed by the status vector 415 being sent to the A side. This in turn produces the local sequence at 416 on the A side with an acceptance vector 417 being sent to the B side to indicate acceptance by the channels. At 418 both couplers have their data transfer logic networks 104, 104' enabled and data begins to flow from the B side to the A side into the channel as shown at 419. Note that the arrival of the data bytes, at the channel-connected coupler initiate the local service-in, service-out, data-in and data-out sequences needed to transfer data into the channel.

When a stop condition is signalled by the channel at 420, the A side coupler 16 disables its network 104 and sends the appropriate end sequence vector at 421 indicating no error to the B side coupler 20. An end sequence is then begun as shown at 422.

In the event a data link error is detected at the A side coupler 16, the appropriate vector 423 would have been sent at 421 with a request to retransmit at 424 after the A coupler had commenced a retry of the read command at 425 followed by an initial selection sequence 426 and an enabling of the data transfer network 104 at 427.

The retransmission originates from the buffer 104' at the B side and does not require an initial selection sequence at that side. A satisfactory retransmission is followed by an end sequence as shown at 418 with appropriate vectors, originating from the B side coupler, being produced in response to the recognition that this was a retransmission and not because of actual signalling between the B side coupler and its attached control unit.

The retransmission of a data block is particularly useful for a writing sequence on a tape. In the event of an error detected from the communication link, a retransmission from the A side coupler can be done without having to advise the channel of an error and without having to back up the tape in the routine 400 shown in FIG. 8. In such case, as shown at 440 in FIG. 9, an initial selection sequence is first executed between the B side coupler and the control unit to which the tape unit is connected, without having to initiate such selection on the A side.

Thus, prior to the retransmission an initial selection step at 442 occurs between the channel and coupler 16 and responses from coupler 20 originate at 443 from its microprocessor only, without addressing the B side connected control unit. The B side microprocessor recognizes this mode from the address that accompanied the write command during the initial selection 442.

When an error is detected by the B side microprocessor 112 after the data was stored in the B side buffer, an error indicating vector is sent to the A side coupler which begins a retransmit mode at 444 from the A side buffer. After the data has been correctly received as at 446, the B side coupler 20 begins its initial selection at 448 with the proper control unit and I/O device identified by the command issued at 442. Data is then written onto the tape at 450 followed by an end sequence at 452.

Figure 9:
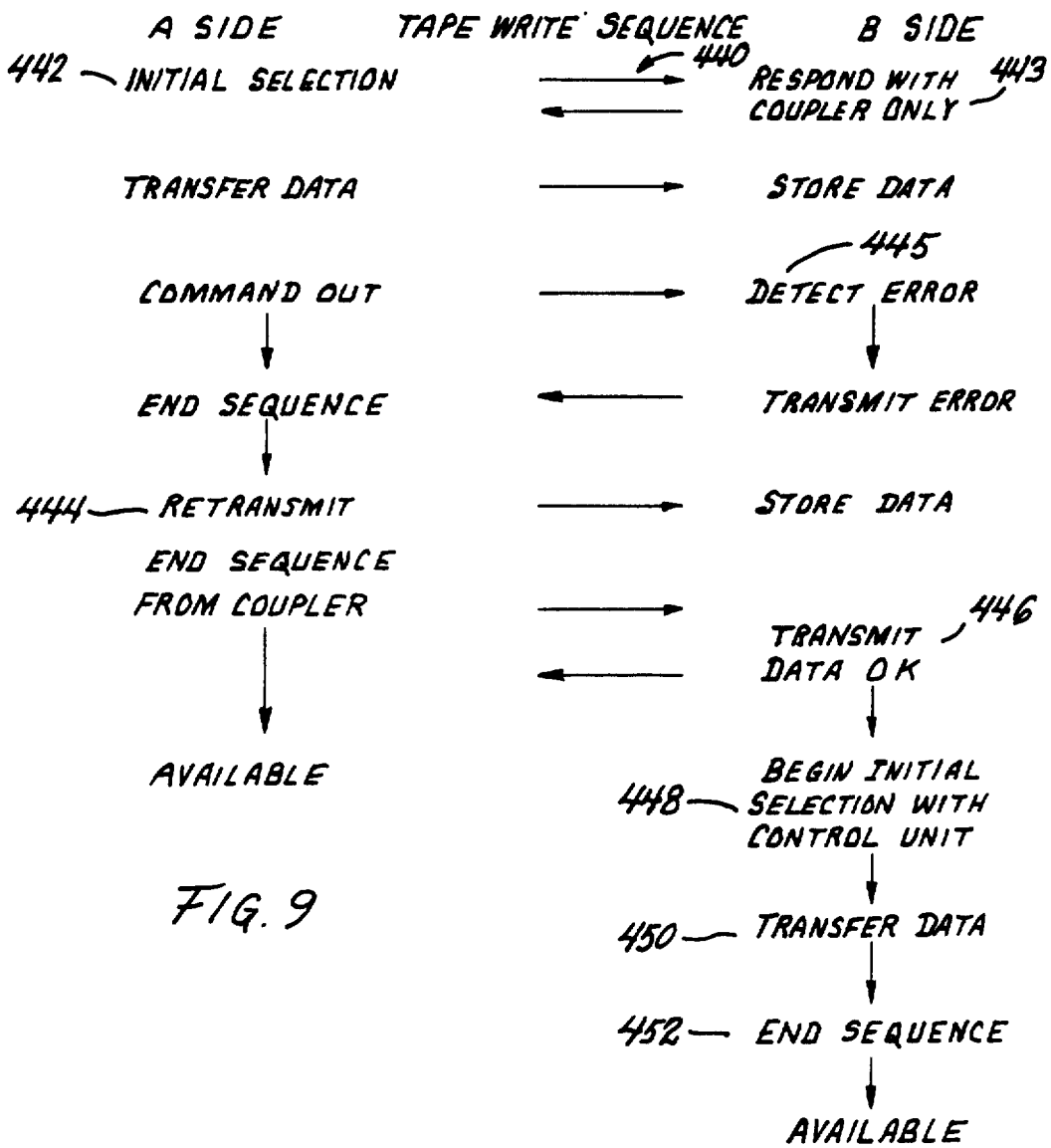
FIGS. 9 is a vertically arranged and laterally displaced timing diagrams for an error recovery technique in accordance with the invention.
Figure 10:
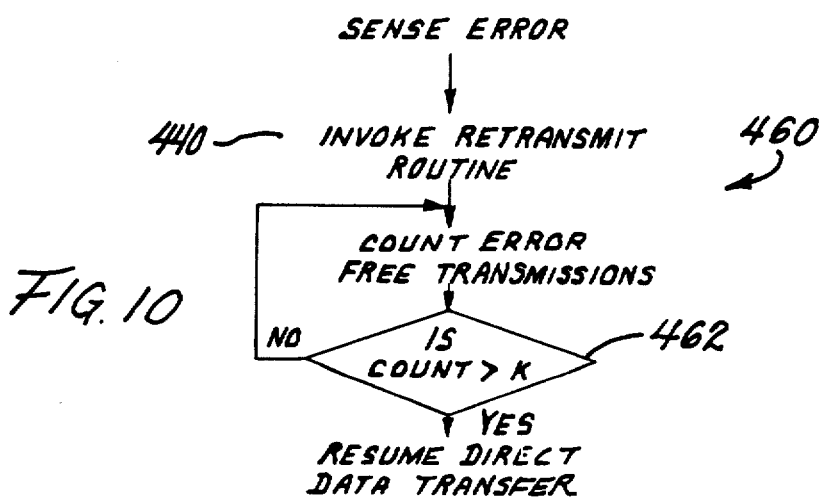
FIG. 10 is a flow chart of steps for increasing the transmission link efficiency when there are no transmission errors.
Figure 13:
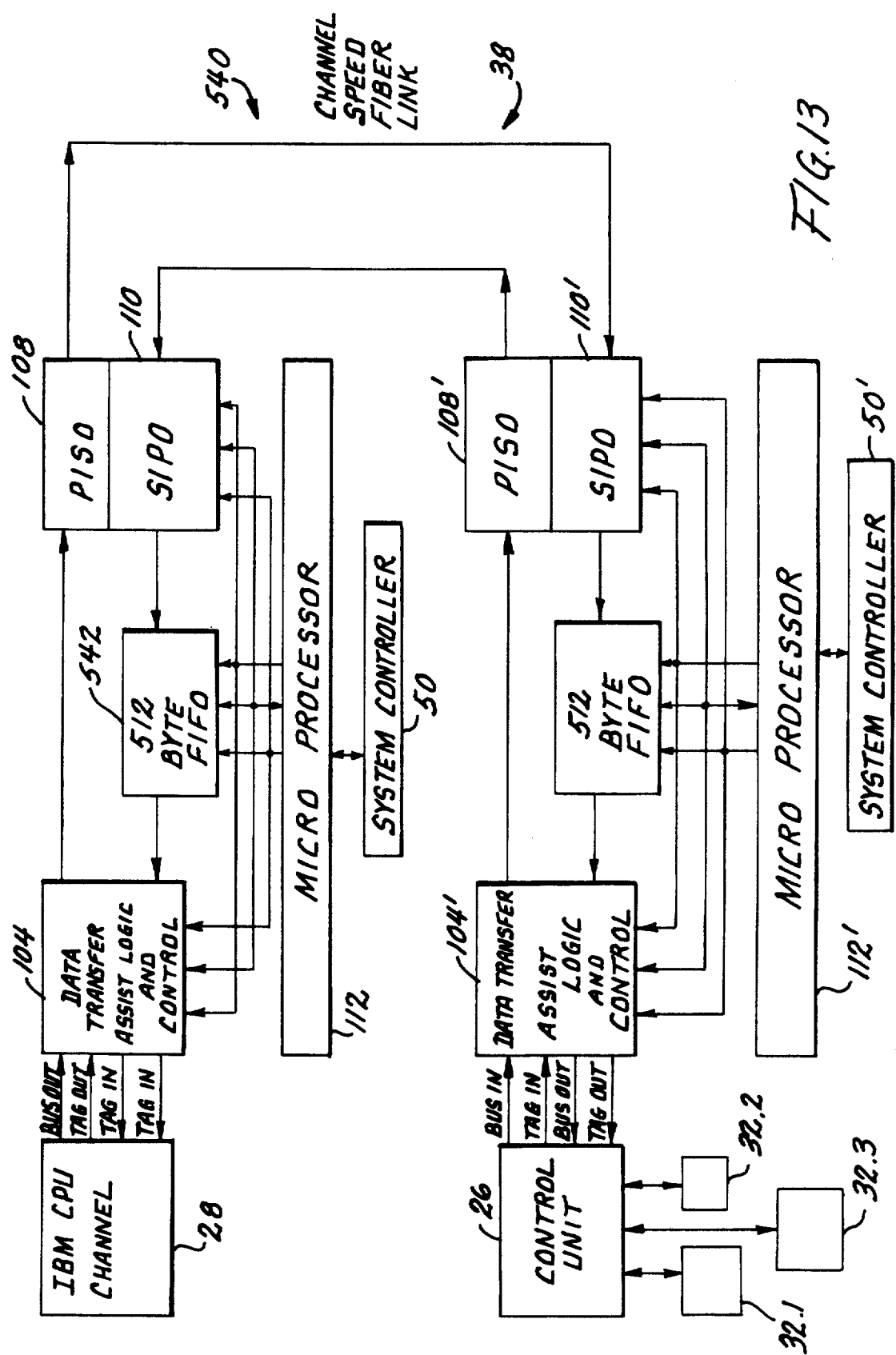
FIG. 13 is a block diagram of another channel to control unit extender in accordance with the invention.

Since the effective data rate is reduced by the routine of FIG. 9, another approach as shown at 460 in FIG. 10 is to normally write data directly onto a tape and only revert to the routine of FIG. 9 when an error is first sensed at 445. The routine 440 is maintained in effect for a time until confidence in the data link's ability to transmit is restored, for example after a predetermined number of error free transmissions have been detected at 462.

A particularly advantageous feature of system 22 is its ability to handle fixed length data transfer requirements for I/O devices such as printers. For example, one type of printer may require 132 bytes of data at one time and neither more nor less. The channel, therefore, is prepared to write precisely this many bytes, and if a control unit requests more bytes than this allotted amount, an error in the channel software arises.

By virtue of the remote location of the printer, the local channel connected coupler 16 will continue to request data for the printer I/O device at the end of the fixed length of data because it has not yet received the appropriate end response from the remote control unit on the B side. Hence, a request for data in excess of the amount scheduled occurs and the channel will note an error.

Techniques illustrated in FIGS. 11 and 12 are illustrative of how the coupler units resolve this. A counter 464 is designated in each of the A and B side couplers 16, 20 for example in networks 104, 104' to count the number of bytes being transmitted across the channel/coupler A interface and the coupler B/Control Unit interface. These counters can be in the microprocessor but preferably in the data transfer logic networks 104, 104' where the microprocessors can poll them while the hardware keeps the counters current.

In FIG. 10, after the command 498 from the channel, the counters are reset at 500, and 502. When data transfer occurs, each counter is incremented at 504 and 506. At the end of the data transfer the count in the B side coupler is sent at 508 to the A side where the counts are compared at 510. If there is a difference the B count is assumed as correct and stored in the A counter and a retry of the initial command 498 requested at 512. After an initial selection that is only executed on the A side, a data transfer occurs at 514 as at 504, except when the A side has gone through as many data byte transfers as required by its A counter, further data transfers are stopped. The data transferred is discarded. At this time the correct number of bytes appear to have been transferred as recognized at 516 and no error is reported by the channel.

FIG. 11 demonstrates another technique 520 for assuring a correct data byte transfer for fixed length I/O devices. The characteristics of these devices are stored in the device personality memory 152 (see FIG. 4) with the appropriate address. Hence, when at 522 a write command with that I/O device issues, its fixed length characteristic is stored in the A side counter at 524. Data transfer then continues at 526 only for as long as the number of bytes identified in the A side counter. Upon a recognition of the transfer of bytes of the particular fixed length, further transfers are halted. The correct length of a data transfer can be determined by decrementing the counter and decoding the occurrence of a zero count.

FIG. 12 illustrates a simplified form 540 for channel to control unit extender. In this case, the full data block storage and retransmission feature is deleted and data is run at full channel speed through a secure link 38 such as a fiber optic link into an I/O device. A small FIFO buffer 542, of 512 bytes, is at the receiving end of the bidirectional data link 38. The programming of the microprocessors 112, 112' can be very similar to that described herein.

Having thus described a system for connecting a channel to a remotely located control unit through a channel speed serial communication link the advantages of the system can be appreciated. The microprocessor is provided with a series of vectors and response characteristics as may be required to accommodate well known channel to control unit communication protocols. A listing of such vectors is affixed hereto. Variations may be adapted without departing from the scope of the invention as determined by the following claims.

What is claimed is:

1. A system with which an IBM CPU channel located at one site can communicate at high channel speeds through a channel-connected-coupler unit, a serial bidirectional high speed data link and a control-unit-connected-coupler unit with a control unit located at another site for data transfer with an I/O device, comprising:

means in each coupler unit for generating initial selection, and end sequence, interlock signals to the respectively-connected channel and control unit;

means for receiving serial data from the data link and converting the data to parallel form suitable for transfer to a connected, channel or control unit and means for converting parallel data from a connected, channel or control unit to a serial form suitable for transmission over the data link;

means in each coupler unit for producing vectors representative of predetermined interlock sequences between a channel and a control unit for transmittal along the data link to activate local interlock signals from said means for generating initial selection and end sequences interlock signals;

means in each coupler unit for producing local interlock signals to the connected channel and the connected control unit for the transfer of data therebetween at high channel speeds; and means in each coupler unit for transferring data bytes at high channel speeds between a connected channel and a connected control unit and through the serial data link for high channel speed data transfer between the channel and the control unit through said data link in a manner that is transparent to the CPU.

2. The system as claimed in claim 1 wherein each said coupler unit further has:

buffer means for storing a block of data bytes transferred following an initial selection sequence, and means for retransmitting a said stored data block from one buffer means in one coupler unit to the other buffer means in the other coupler unit in case of a data byte error.

3. The system as claimed in claim 2 and further including:

means at said control-unit-connected-coupler unit for activating its initial selection interlock signals generating means after a said data block is received at the latter coupler unit without error so as to transfer data from the buffer means to an I/O device connected to said control unit.

4. The system as claimed in claim 1 wherein the channel-connected-coupler unit includes:

counter means for storing a count corresponding to a predetermined number of data bytes to be transferred from a channel to an I/O device, and means responsive to said counter means in the coupler means for limiting the transfer of data bytes from the channel to said predetermined number of data bytes.

5. The system as claimed in claim 1 wherein the control unit is connected to an I/O device that requires a fixed number of data bytes and wherein the coupler unit that is connected to the channel has first counter means for counting the number of bytes transferred from a channel to a coupler unit connected thereto;

said coupler unit that is connected to the control unit having second counting means for counting the number of bytes transferred from said coupler unit to the connected control unit;

means for storing the count in said second counting means in said first counting means after the predetermined number of data bytes have been transferred to the I/O device to enable said channel to identify a correct data transfer to said I/O device in the event the counts in said first and second counter means were not the same during said transfer.

6. The system as claimed in claim 1 wherein each coupler unit further includes:

data transfer and assist control logic means for controlling data transfer through the coupler unit, said data transfer and assist control logic means including means for producing appropriate interlock protocol signals to the respectively connected channel or control unit during said data transfer without having to transfer such protocol signals over the data link to the remote coupler unit.

7. The system as claimed in claim 6 and further including:

means for correcting errors in data received at a coupler unit through the data link.

8. The system as claimed in claim 7 wherein the data error correcting means in each coupler unit includes:

means for appending a correction code to data bytes to be transmitted to a remote coupler unit;

means for locally generating a correction code to each data byte received at a coupler unit;

means for comparing the locally-generated correction code with the appended correction code; and means for retransmitting the data from the remote coupler unit when said comparison means indicates an error in the data.

9. The system as claimed in claim 1 and further including:

controller means having characteristic operational programs for each coupler unit for transferring by down loading said operational programs to coupler units to establish the desired personality of the coupler units.

10. The system as claimed in claim 9 wherein the controller means is located in the vicinity of one site and is connected to the coupler unit at that one site to transfer operational programs to the coupler that is located at the other remote site, through the data link.

11. The system as claimed in claim 1 wherein the coupler unit connected to the channel includes:

means for storing operational data for respective I/O counter means responsive to the storing means for holding a count representative of the number of bytes for a fixed length I/O device; and means responsive to the counter means for generating a signal representative of the transfer of said number of bytes from the channel to terminate the transfer.

12. A method for enabling an IBM CPU operated by software and having a channel located at one site to communicate at high channel speeds through a channel-connected coupler unit, a serial bidirectional high channel speed data link and a control-unit-connected coupler unit with a control unit located at another site for data transfer with an I/O device, comprising the steps of:

initiating first local interlocked sequences of signals at channel speed between the channel and the coupler unit that is connected thereto to establish data communication between the channel and its connected coupler unit;

generating vectors representative of predetermined interlocked sequences between a channel and a control unit;

during said initiating step sending preselected vectors between the coupler units over the data link to initiate second local interlocked sequences of signals at channel speed between the control unit and the coupler unit that is connected thereto to establish data communication between the control unit and its connected coupler unit;

sending data over the data link between the channel at one site and the control unit at the other site without signal interlock between the coupler units and in a manner that is transparent to software in the CPU; and completing said data communication with the generation of local interlocked end sequences of signals respectively between the channel and its connected coupler unit and between the control unit and its connected coupler unit.

13. The method as claimed in claim 12 and further including the steps of:

storing, in each coupler unit, an entire block of data bytes to be transferred in response to an initial selection sequence at one site; and retransmitting a said stored data block when a data byte error has been detected after transmission of the data block through said data link.

14. The method as claimed in claim 13 and further including the steps of:

enabling the second local interlocked sequences when a said data block is received at the remote coupler unit without error; and transferring said data block to an I/O device connected to said control unit.

15. The method as claimed in claim 12 and further including the steps of:

storing a count, representative of a predetermined number of data bytes intended for a fixed-length I/O device, in the coupler unit that is connected to the channel; and causing a correct count of data bytes during data transfer from the channel to its connected coupler unit.

16. The method as claimed in claim 15 wherein the causing step includes the steps of:

altering the stored count in response to the transfer of each data byte from the channel; and halting further data transfer from the channel when a predetermined count has been reached.

17. The method as claimed in claim 16 wherein the altering step comprises:
   decrementing the count until it has reached said predetermined count.

18. The method as claimed in claim 12 and further including the steps of:
   storing a first count representative of the number of bytes arrived from the channel at the remote coupler unit;
   storing a second count representative of the number of data bytes requested by the channel-connected coupler unit;
   comparing the first and second counts and generating a command retry sequence between the channel and its connected coupler unit when the first and second counts are not the same; and
   inhibiting transfer of said data bytes to the remote coupler unit during the retry sequence when the data bytes are intended for a fixed length I/O device.

19. A system with which an IBM CPU channel located at one site can communicate at high channel speeds through a channel connected coupler unit, a serial bidirectional high speed data link and a control unit connected coupler unit with a control unit located at another site for data transfer with an I/O device, comprising:
   means in each coupler unit for generating initial selection, and end sequence, interlock signals to the respectively-connected channel and control unit;
   SIPO means in each coupler unit for receiving serial data from the data link and converting the data to parallel form suitable for transfer to a connected, channel or control unit and PISO means for converting parallel data from a connected channel or control unit to a serial form suitable for transmission over the data link;
   data transfer and assist control means in each coupler unit for controlling transfer of data bytes through the coupler unit, said data transfer and assist control logic means including means for producing appropriate interlock protocol signals to a respectively connected channel or control unit during said data transfer; and
   means in each coupler unit for transferring data bytes at high channel speeds without the interlock protocol signals between a connected channel and a connected control unit and through the PISO means, the serial data link and the SIPO means for high channel speed data transfer between the channel and the control unit through said data link in a manner that is transparent to the CPU.

20. The system as claimed in claim 19 wherein each said coupler unit further has:
   buffer means for storing a block of data bytes transferred following an initial selection sequence.

21. The system as claimed in claim 20 wherein each said coupler unit has:
   means for causing a retransmittal of a said stored data block from one buffer means in one coupler unit to the other buffer means in the other coupler unit in case of a data byte error.

22. The system as claimed in claim 21 and further including:
   means at said control-unit-connected-coupler unit for activating its initial selection interlock signals generating means after a said data block is received at the latter coupler unit without error so as to transfer data from the buffer means to an I/O device connected to said control unit.

23. The system as claimed in claim 19 wherein the channel-connected-coupler unit includes:
   counter means for storing a count corresponding to a predetermined number of data bytes to be transferred from a channel to an I/O device; and
   means responsive to said counter means in the coupler means for limiting the transfer of data bytes from the channel to said predetermined number of data bytes.

24. The system as claimed in claim 19 wherein the control unit is connected to an I/O device that requires a fixed number of data bytes and wherein the coupler unit that is connected to the channel has first counter means for counting the number of bytes transferred from a channel to a coupler unit connected thereto;
   said coupler unit that is connected to the control unit having second counting means for counting the number of bytes transferred from said coupler unit to the connected control unit;
   means for storing the count in said second counting means in said first counting means after the predetermined number of data bytes have been transferred to the I/O device to enable said channel to identify a correct data transfer to said I/O device in the event the counts in said first and second counter means were not the same during said transfer.

25. A method for enabling an IBM CPU operated by software and having a channel located at one site to communicate at high channel speeds through a channel-connected coupler unit, a serial bidirectional high channel speed data link and a control-unit-connected coupler unit with a control unit located at another site for data transfer with an I/O device, comprising the steps of:
   initiating first local interlocked sequences of signals at channel speed between the channel and the coupler unit that is connected thereto to establish data communication between the channel and its connected coupler unit;
   during said initiating step sending signals between the coupler units over the data link to initiate second local interlocked sequences of signals at channel speed between the control unit and the coupler unit that is connected thereto to establish data communication between the control unit and its connected coupler unit;
   sending data over the data link between the channel at one site and the control unit at the other site without signal interlock between the coupler units and in a manner that is transparent to software in the CPU; and
   completing said data communication with the generation of local interlocked end sequences of signals respectively between the channel and its connected coupler unit and between the control unit and its connected coupler unit.

26. The method as claimed in claim 25 and further including the steps of:
   storing, in each coupler unit, an entire block of data bytes to be transferred in response to an initial selection sequence at one site; and
   retransmitting a said stored data block when a data byte error has been detected after transmission of the data block through said data link.

27. The method as claimed in claim 26 and further including the steps of:
   enabling the second local interlocked sequence when a said data block is received at the remote coupler unit without error; and
   transferring said data block to an I/O device connected to said control unit.

28. The method as claimed in claim 25 and further including the steps of:
   storing a count, representative of a predetermined number of data bytes intended for a fixed-length I/O device, in the coupler unit that is connected to the channel; and
   causing a correct count of data bytes during data transfer from the channel to its connected coupler unit.

29. The method as claimed in claim 28 wherein the causing step includes the steps of:
   altering the stored count in response to the transfer of each data byte from the channel; and
   halting further data transfer from the channel when a predetermined count has been reached.

30. The method as claimed in claim 29 wherein the altering step comprises:
   decrementing the count until it has reached said predetermined count.

31. The method as claimed in claim 30 and further including the steps of:
   storing a first count representative of the number of bytes arrived from the channel at the remote coupler unit;
   storing a second count representative of the number of data bytes requested by the channel-connected coupler unit;
   comparing the first and second counts and generating a command retry sequence between the channel and its connected coupler unit when the first and second counts are not the same; and
   inhibiting transfer of said data bytes to the remote coupler unit during the retry sequence when the data bytes are intended for a fixed length I/O device.

* * * * *